(12) United States Patent
Warren, Jr. et al.

(10) Patent No.: US 11,147,257 B2
(45) Date of Patent: Oct. 19, 2021

(54) SOFTWARE PROCESS FOR TENDING CROPS USING A UAV

(71) Applicants: Kenneth T. Warren, Jr., Sedley, VA (US); Diana P. Warren, Sedley, VA (US)

(72) Inventors: Kenneth T. Warren, Jr., Sedley, VA (US); Diana P. Warren, Sedley, VA (US)

( * ) Notice: Subject to any disclaimer, the term of this patent is extended or adjusted under 35 U.S.C. 154(b) by 449 days.

(21) Appl. No.: 16/157,346

(22) Filed: Oct. 11, 2018

(65) Prior Publication Data

US 2020/0113166 A1 Apr. 16, 2020

(51) Int. Cl.
*A01M 7/00* (2006.01)
*G06K 9/00* (2006.01)
*B05B 13/00* (2006.01)
*G05D 1/10* (2006.01)
*G05D 1/00* (2006.01)
*B64D 47/08* (2006.01)
*B64C 39/02* (2006.01)
*B05B 12/12* (2006.01)

(52) U.S. Cl.
CPC ........... *A01M 7/0014* (2013.01); *B05B 12/12* (2013.01); *B64C 39/024* (2013.01); *B64D 47/08* (2013.01); *G05D 1/0094* (2013.01); *G05D 1/101* (2013.01); *G06K 9/00657* (2013.01); *B05B 13/005* (2013.01); *B64C 2201/027* (2013.01); *B64C 2201/123* (2013.01); *B64C 2201/126* (2013.01); *B64C 2201/141* (2013.01)

(58) Field of Classification Search
CPC .............. A01M 7/0014; A01M 7/0089; A01M 21/043; B05B 12/12; B05B 13/005; B64C 39/024; B64C 2201/027; B64C 2201/123; B64C 2201/126; B64C 2201/128; B64C 2201/141; G05D 1/0094; G06K 9/00657
See application file for complete search history.

(56) References Cited

U.S. PATENT DOCUMENTS

| | | | |
|---|---|---|---|
| 2012/0042563 A1* | 2/2012 | Anderson | A01G 7/06 43/132.1 |
| 2013/0068892 A1* | 3/2013 | Bin Desa | B64C 39/024 244/190 |
| 2016/0302351 A1* | 10/2016 | Schildroth | B64C 39/024 |
| 2017/0258005 A1* | 9/2017 | Cutter | A01C 21/005 |
| 2018/0014452 A1* | 1/2018 | Starr | A01G 7/00 |
| 2018/0065747 A1* | 3/2018 | Cantrell | B64C 39/024 |
| 2019/0050948 A1* | 2/2019 | Perry | G06Q 10/04 |
| 2020/0019777 A1* | 1/2020 | Gurzoni, Jr. | G06K 9/00697 |

* cited by examiner

*Primary Examiner* — Ryan A Reis
(74) *Attorney, Agent, or Firm* — Bradley D. Goldizen (57) ABSTRACT

A software process for controlling a configurable UAV that includes a plurality of databases of crop plants, herbicides, insecticides and weeds. An area is defined to be treated. Thereafter, a scout UAV with an on-board camera is flown over the pre-defined area. Images detected by the camera are compared with the crop, pest and weed databases to respectively identify the crop plants, insects, and weeds. The insects and weeds are then subjected to a spot blast of pesticide/herbicide to kill them. Thus, the process results in a more efficient application of treatment chemicals which leads to less adverse environmental impacts associated with the use of pesticides and herbicides.

10 Claims, 9 Drawing Sheets

| Weed Type | Pictures | Herbicide | Date Detected | Location |
|---|---|---|---|---|
| Pigweed |  | Dicamba XP | 06/25/17 | 34°3'8"N 118°14'37"W |
| Ragweed |  | Roundup | 08/12/17 | 34°3'8"N 118°14'36"W |
| Horseweed |  | Envoke | 08/14/18 | 34°3'7"N 118°14'37"W |
| Pokeberry |  | Pictrex 4L | 07/07/18 | 34°3'8"N 118°14'37"W |

Fig. 5

| Pest Name | Pictures | Pesticide | Date Detected | Location |
|---|---|---|---|---|
| Stink Bug |  | Bi-Fenthrin | 06/12/17 | 34°3'8"N 118°14'36"W |
| Corn Ear Bug |  | Besiege | 08/13/18 | 34°3'8"N 118°14'37"W |
| Japanese Beetles |  | Bi-Fenthrin | 06/03/18 | 34°3'8"N 118°14'36"W |
| Loopers |  | Intreprid | 05/20/18 | 34°3'7"N 118°14'37"W |
| Bagworms |  | Deseige | 06/17/18 | 34°3'8"N 118°14'37"W |

Fig. 6

| Chemical Name | Cost | Amt. in Inventory | Amount Used | Next Date of Application | Untreated Areas |
|---|---|---|---|---|---|
| Dicamba XP | $$$/gallon | 200 gallons | 20 gallons | 06/15/18 | 34°3'8"N 118°14'37"W |
| Round Up | $$$/gallon | 250 gallons | 50 gallons | 06/28/18 | 34°3'8"N 118°14'37"W |
| Envoke | $$$/gallon | 300 gallons | 10 gallons | 07/03/18 | 34°3'8"N 118°14'36"W |
| Bifentarin | $$$/gallon | 425 gallons | 25 gallons | 05/15/18 | 34°3'7"N 118°14'37"W |
| Besiege | $$$/gallon | 150 gallons | 15 gallons | 07/24/18 | 34°3'8"N 118°14'37"W |

Fig. 7

| Crop Name | Pictures | Fertilizer Type | Date of Last Application | Next Application Date | Planting Date |
|---|---|---|---|---|---|
| Corn |  | Bi-Fenthrin | 06/15/18 | 06/30/18 | 05/15/18 |
| Soybeans |  | Besiege | 06/28/18 | 07/14/18 | 05/20/18 |
| Peanuts |  | Bi-Fenthrin | 07/03/18 | 07/25/18 | 05/18/18 |
| Wheat |  | Intreprid | 05/15/18 | 06/15/18 | 05/15/18 |
| Tomatoes |  | Deseige | 06/24/18 | 07/24/18 | 05/18/18 |

SOFTWARE PROCESS FOR TENDING CROPS USING A UAV

CROSS-REFERENCE TO RELATED APPLICATIONS

There are no related patent applications.

STATEMENT REGARDING FEDERALLY SPONSORED RESEARCH OR DEVELOPMENT

The patent application is not subject to federally sponsored research and development funding.

BACKGROUND OF THE INVENTION

The present invention generally relates to a software process for controlling an unmanned aerial vehicle (UAV) or a plurality of UAVs in farming operations. More specifically, the invention relates to a method for controlling weeds whilst using a UAV to spot treat a crop. Insects may also be treated using this process and the process may be utilized in identifying areas of the crop that need fertilizing and watering, as well as applying other treatment chemicals.

Agricultural crops require constant monitoring and tending throughout the growth process. To ensure maximum returns on their investment, farmers must continually monitor important factors such as the health of the crop, moisture content in the soil, weed population, and pest control. Weeds rob the soil of moisture and deplete the soil of nutrients. Weed control typically requires the application of a broad-spectrum herbicide which does not adversely affect the crop. Such herbicide is expensive and should not be over applied as the herbicides may be washed off during irrigation operations or heavy periods of rain to inadvertently migrate into water supply systems. Likewise, pests destroy crops and reduce the overall yield produced. This raises the farmer's cost of producing the crop and in turn increase the price paid by the consumer. It is an aim of the present invention to teach an improved method of controlling weeds, pests, and improving crop yields.

Unmanned air vehicles are utilized to perform various tasks such as, for example, reconnaissance and surveillance, data acquisition, and general research such as the study of weather patterns. Unmanned air vehicles can take on various forms from gas filled inflatables such as helium balloons, to gliders, to motor or engine powered aircraft. See for example, U.S. Patent Publication No. 20080149758 A1 to Colgren et al. Typically, a UAV includes a propulsion system controlled by a central processing unit (CPU) and associated flight control surfaces. A transceiver receives instructions from the user and relays flight data or video feeds back to the user. Such flight data may include coordinates data to inform the user of the location of the UAV.

Previously, UAVs have been contemplated for use in agricultural pesticide spraying, fertilization, and crop growth status monitoring. Some of these UAVs have a GPS navigation module, an application platform, a central control module, and hydraulic module kits. UAVs have been described as carrying pesticide containers and a spraying section with a central control module control which controls the GPS navigation module to enable precise point application. Image recognition and processing technology has been contemplated for use in monitoring crop growth, with one based on application development platform crop remote monitoring software.

BRIEF SUMMARY OF THE INVENTION

The present invention is a novel process for cost-effectively controlling the application of treatment chemicals such as herbicides, pesticides, and fertilizers with a UAV system throughout the growing process of crops. For purpose of this disclosure, the terms UAV and drone are used interchangeably and mean the same. At least one UAV is provided with an accompanying remote controller having a microprocessor and associated transceiver which communicates with the UAV. The remote controller includes at least a user interface which allows a travel area to be defined on a map. The UAV may be autonomous during operations and after a treatment area has been defined. Moreover, a plurality of UAVs may be deployed and which communicate directly with one another to treat a field of plants. Initially, the area of the field to be treated is uploaded to the UAV(s). Alternatively, a UAV may be flown around an area under the control of an operator to define an area. In this instance, the UAV automatically registers data points corresponding to the perimeter of the field to be treated. Otherwise, the drone may be placed in a field and programmed to use onboard cameras to recognize boundaries such as fence lines and the like to define the area to be treated.

In a preferred embodiment, a scout drone is initially deployed to the field to determine the orientation and location of the rows of plants and conduct an initial assessment of the area. This preliminary flight over at least a portion of the field is utilized to conduct samples of the field by identifying the weeds and/or pests that need to be destroyed. These samples may be of a specific sized area such as a square foot or square yard to obtain an estimate of the amount of herbicide or pesticide necessary to effectively treat the entire crop within the defined area. The discovered weeds/pests are reported back to the remote controller for determining the appropriate treatment to be applied to the crops within the defined field area. The various databases are consulted to identify the appropriate herbicide and/or pesticide according to the sampled results. Such use of the databases further reduces the cost of providing effective treatment. A portion of a treatment database may be utilized to determine the cheapest treatment option available for destroying the weeds/pests by determining which treatments may be used and simultaneously calculating a cost per acre for treatment. The current cheapest cost of each treatment option is determined and thereafter applied to the field to be treated. Treatment drones are used to apply the herbicide and/or pesticide to the treatment area.

In another embodiment, the area to be treated by the UAV may be defined on a map that is stored within the remote controller. Various mapping software programs, overlays, and satellite images may be utilized in this instance. The stored map and accompanying overlay defining the treatment area are loaded into a memory coupled to the CPU of the UAV. The UAV then uses an on-board algorithm to fly across the defined area and treat various crops. The operating instructions of the UAV include a subroutine that reroutes the UAV around objects which should not be treated such as obstacles or animals which are encountered while traversing the treatment area. If an object is encountered, the UAV determines what the obstacle is and acts accordingly. In the case of animals, the UAV may comprise a subroutine which drives the animal from the treatment area via onboard visual or audible warnings. If a stationary object is encountered or the animal cannot be driven from the area, the UAV defines an untreated area within the treatment area and will alert the user or attempt to treat the area during a later period.

If a plurality of objects is encountered, the UAV records the untreated areas and attempts to treat each sequentially at a later time. If after a few attempts and after the rest of the field is treated, the UAV is unable to treat the areas, then the untreated area is marked on the map and displayed to the user for further instructions.

Map data defining untreated areas is relayed to any other UAVs which may visit the untreated area and attempt to treat at a later time. A video display screen may be included in the remote controller to feed real-time video back from the UAV so that the user can monitor the progress of the crop treatment and take control of the UAV. Other indicators may be included in the display screen such as the travel direction, amount of crop treated, wind speed and direction, UAV elevation, humidity and other environmental conditions.

In addition to a receiver/transmitter, a CPU with flight control routines stored in memory, and the other necessary components for controlling the UAV, the UAV includes at least one camera which takes pictures of a crop of plants and the weeds and/or pests. Subsequent cameras may be added to provide depth perception for more readily discerning weeds from crops. Pictures taken by the camera(s) are automatically stored in a database along with GPS coordinates of the UAV or other location identifying data. Each picture is compared to a first database of crops to determine the health of individual plants within the crop. Water and mineral deficiencies may be recognized and feedback provided to the user for ensuring that an appropriate treatment may be undertaken, if necessary. Lights and speakers may be included on the UAV for driving animals from the treatment area or alerting the operator to various detected conditions.

When used in treating weeds, each picture taken by the UAV is compared to a second database which includes images of weeds. Weeds are identified in each picture and targeted by a spot treatment of herbicide which is contained within an onboard tank. The UAV simply hovers above an identified weed at a specific height which is low enough to ensure that overspray of the herbicide does not occur. In one instance, the UAV is equipped with a single articulating sprayer nozzle. In another embodiment, the UAV includes a boom having a plurality of nozzles which may be singly or in combination operated to treat individual or a plurality of weeds. Thus, only the identified weeds are subjected to the herbicide reducing the amount of herbicide required to treat a crop while preventing herbicide runoff. The UAV may comprise at least a pair of tanks which store both herbicide and an insecticide. An additional database of pests may be maintained within the UAV for identification purposes and differentiating between pests and beneficial insects. When the UAV identifies a pest, the pest will be sprayed with the insecticide. The user may be alerted by the UAV to the type of pest and location such that further monitoring and treatment may be had. That is, many insects lay eggs on the crop which will hatch out after a known period of time. Thus, an alarm may be set to alert the user that the UAV should be deployed at a particular time in the future based upon the type of insect identified and after a gestation period has expired. Moreover, the pest database may comprise a variety pictures of pests during their lifecycles to determine the optimum period of time between treatments.

In a preferred embodiment, an area is defined to be treated on a controller or by a scout drone. The controller may be mobile and include a microprocessor-based input device such as tablet, smart phone, laptop computer, or the like. Otherwise, the controller may comprise a desktop computer including a display screen, input device such as a keyboard, and a joystick for manual control of the UAV(s). That is, a computer or other such controller device includes a map of the area and a flight course is generated on a display screen of the controller. Thereafter, a UAV with an on-board camera is flown over the pre-defined area. Images detected by the camera are compared with the crop and weed database to respectively identify the crop plants, pests, and weeds. The data relating to the type of weeds and types of pests is transmitted to the controller and other UAVs. In this manner, a plurality of UAV(s) may be loaded with specific herbicides and/or pesticides and more effectively deployed. That is, certain weeds and/or pests may be present in different areas. If exclusive herbicides or pesticides are necessary for treating a particular weed or pest, then a specific UAV with the appropriate herbicide or pesticide is deployed. It should be noted that the specific UAV should be more rapidly deployed to treat a pest than a weed. That is, the pest is mobile and may move from an area whilst a weed is stationary. In the preferred embodiment, the weeds are subjected to a spot blast of herbicide to kill them. Thus, the process results in a more efficient application of herbicide which leads to less adverse environmental impacts associated with the use of the herbicides. Likewise, spot treatment of pests with the spraying of insecticides may be performed with the UAV.

It is an object of the invention to teach a software method which controls a UAV or a plurality of UAVs to spot treat weeds within a crop with herbicide. The software method is also useful for treating pests.

It is an object of the invention to disclose a UAV or a plurality of UAVs that can automatically seek out and destroy weeds within a defined area with a safer method of applying herbicide to a crop.

It is a further object of the invention to teach a software process which may spot insects by treating crops with insecticides.

DETAILED DESCRIPTION OF THE INVENTION

The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

The UAV comprises a central processing unit (CPU) which receives a variety of inputs from devices. The devices include RPM feedback for each of the propellers to alert the CPU of the speed of each propeller and allow adjustment thereof. Flight surfaces of the UAV may be manipulated to raise or lower the elevation of the UAV. Otherwise, the propellers may be tilted and accelerated/decelerated to raise and lower the elevation for spraying purposes. While only a few types of crops are shown throughout the application, it should be understood that any crop grown may be treated using the instantly disclosed invention.

Accelerometers detect the direction of travel of the UAV and feed it back to the CPU. Elevation detection means detects the height of the UAV from the ground and the distance from the spray nozzle to the crops, weeds, and pests. The elevation detection means are incorporated as part of a position controller within the UAV. The elevation detection means may comprise a 3-dimensional GPS system which detects the UAV's elevation or as a downward facing transmitter/receiver combination which emits/receives a wave to indicate an elevation from a surface beneath the UAV. Object detection means detects objects such as farming implements, animals, or humans which are present in the field and the distance between the UAV and the detected object and may be implemented using a transmitter/receiver combination which transmits and receives a wave. Moreover, the CPU of the UAV may comprise a memory that includes a plurality of pictures of various objects for identifying the detected object and performing a preset set of instructions. For example, the drone may remove itself from a living organism such as a cow, pig, poultry, or wildlife to avoid spraying a weed that may be eaten by the organism. Thereby, the herbicide or pesticide is prevented from being eaten by the living organism and entering the food chain. The UAV may also include an alert feature that informs the user when a particular object such is detected. For instance, a user may be alerted when a cow is detected in a corn field indicating the possible existence of an opening in a fence that surrounds the field. Moreover, the drone may be equipped with a feature that will identify any opening in the fence and drive a cow back through the opening.

Wind speed detection means and wind direction detection means are part of the environment detector part of the UAV and these feed-back the associated data to the CPU for determining when the spray should be released. A nozzle opening associated with the sprayer may automatically be adjusted to increase or decrease the size of a droplet released from the nozzle to ensure proper coverage during periods of changing wind speeds. It should be noted that the wind speed is important in determining whether the UAV is operating within safe parameters. For instance, if the wind speed is detected by the UAV to be above a safe operating speed, the UAV will suspend spraying operations, mark an area where treatment has been suspended and may not be operated until the wind is below a safe operating speed. In this instance, the operator can preset the wind speed to an upper limit which is a safe operating wind speed. If this wind speed is exceeded, a deployed drone will automatically return to its docking station until the wind speed drops below a safe operating speed for a preset period of time.

The drone includes at least one tank for holding a treatment chemical such as a pesticide or herbicide. Liquid fertilizer may also be administered to the crop by the UAV. In a first embodiment, a traversing nozzle is connected to the tank and may be rotated to an appropriate angle for engaging weeds and insects. In a preferred embodiment, the nozzle is limited to traversing only one-hundred and eighty degrees to ensure that a supply tubing connected to the nozzle is not pinched shut. Otherwise, the nozzle may be in fixed relationship to the drone and the drone may be moved to an appropriate treatment distance and angle for administering the chemicals. In a further embodiment, the UAV may be equipped with a spray boom that comprises either individual or group actuated nozzles. A pump is in-line between the tank(s) and nozzle to pressurize the fluid for spraying purposes. The CPU considers the aforementioned data to determine where the pesticide or herbicide should be released. In the preferred embodiment, a discharge opening of the spray nozzle may be controlled to vary between a broad and narrow stream according to flight conditions such as height above the plants or pests. The pump within the UAV pressurizes the fluid within the herbicide and/or insecticide tank or in-line between the tank and the spray nozzle(s).

The flight control features of the UAV include accelerometers and wind detection means to account for any wind which may inadvertently cause overspray or push the UAV into an undesired position. Feedback from the accelerometers, wind direction detection means, and wind speed detection means are fed back into the CPU and considered when flying the UAV. The information fed back to the CPU from these various devices not only determine the distance and location where treatment chemicals should be deployed but are also used to determine safe operating conditions for the UAV.

Moreover, the operating instructions may include a subroutine that causes the herbicide or insecticide to be sprayed on the windward side of the UAV to account for a breeze. That is, if the herbicide or insecticide is sprayed on the windward side, the wind will carry it in the direction of the wind to ensure that it is administered in a cost-effective manner.

The program may video record or snap a picture of the wetted weed or insect after the treatment has been applied to confirm the accuracy of the spraying. The user sets the over wind speed threshold to automatically shut down the treatment process once the wind exceeds the preset threshold.

A plurality of drones may be networked to communicate with one another such that a scout drone first flies down rows of plants and plot the position of the crops, weeds and insects to relay this information back to another drone. The scout drone is preferably equipped with a tank that includes a pesticide to treat pests when they are first detected as the pests are typically mobile and move to a different location over time. If there are two or more spraying drones, they may communicate with one another to relay information where to pick up if one runs out of herbicide or where it discontinues the treatment process.

Figure 1:
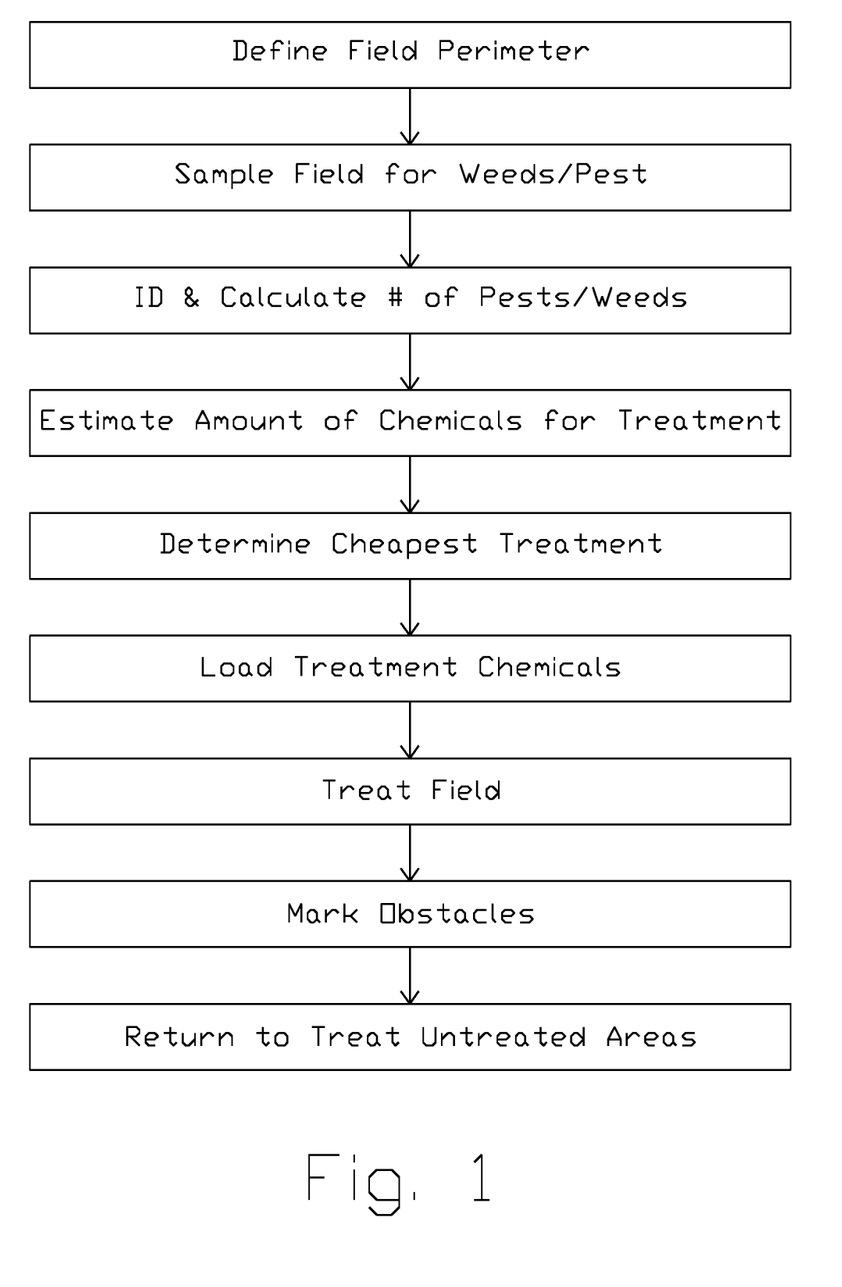
FIG. 1 lists the general steps for realizing the invention.

FIG. 1 shows the steps which include preparing the UAV for flight which includes initially defining a field to be treated and identifying the rows of crops. This may be achieved through the use of a map overlay, providing the UAV with coordinates of the perimeter, or by using a camera to photograph and identify perimeters such as fences, trees, streams or other barriers of the perimeter. The rows are recognized as long lines of plants arranged in a linear fashion and with the rows arranged substantially equidistance from one another. Next, an initial overflight of the field occurs which may comprise taking pictures of smaller portions of the field to be treated. In the preferred embodiment, the sampling occurs by flying a scout drone over the field and periodically defining a small area within the field. For example, the smaller area may be a one square yard area or a one square foot area. The scout drone is preferably equipped with a single nozzle that applies pesticides to identified pests during this initial overflight. Photographs of these areas are taken and the number of weeds and pests are determined for each of the sampled areas as well as the health of the plants comprising the crop. An average of pests and weeds for each area is calculated and the overall number of pests and/or weeds are extrapolated by multiplying this average by the overall size of the field to be treated. In this manner, a rough estimate of the amount of treatment liquid and costs may be calculated prior to engaging in the treatment process. Moreover, the treatment database may be consulted to determine whether there is enough treatment liquid on hand to treat the entire area and the most cost-effective treatment solution. If the initial amount of treatment liquid is deficient, the process determines the next most cost-effective method of treating the crops using alternative treatment liquids. That is, the cheapest treatment liquid on hand is used until depleted and the next successively cheapest treatment is used until the entire crop is treated according to the types of pests and weeds detected.

Next the herbicide and/or insecticide is loaded into the tank(s) of the UAV(s). The UAV(s) is then launched and traverses the field while video recording it. If an object is detected, the UAV flies around it and defines the area around the object that has not been treated. If the object is a fixed object, the UAV determines any cross-wind speed and if it is within a safe operating speed, it flies near the fixed object. If the object is an animal, the UAV marks an appropriate sized area and flies to a safe distance from the animal before spraying operations are continued. Periodically, the UAV will return to the untreated area to determine whether the animal is present. If it is not present, then the area will be treated. If the animal is present and the remaining portion of the treatment area has been treated then the UAV returns to the docking station. Otherwise, the UAV continues treating the treatment area while continuously monitoring the environmental conditions, the herbicide/insecticide fluid and the battery level. At the completion of the treatment, the UAV returns to the docking station.

Figure 2A:
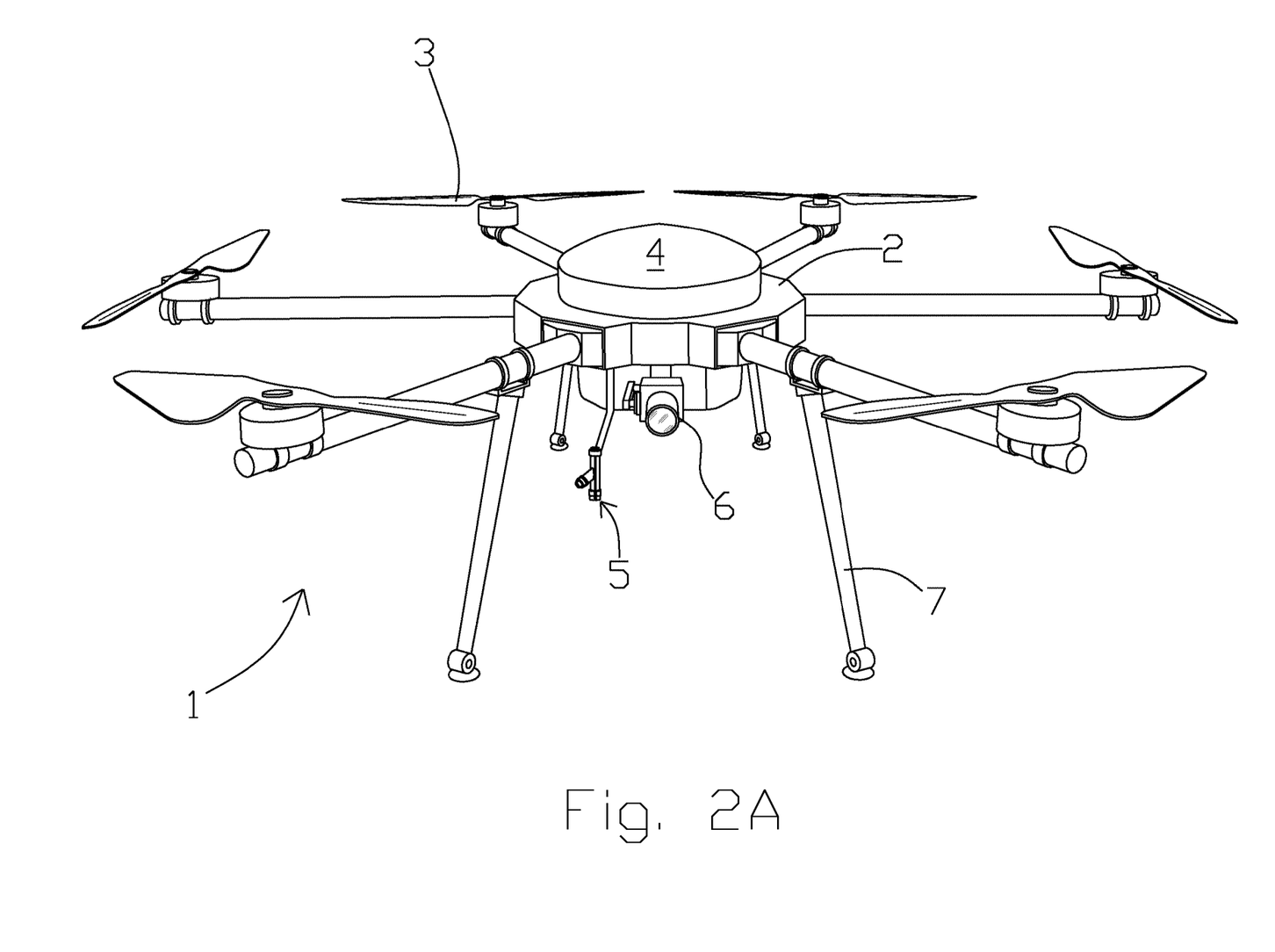
FIG. 2A shows an elevation view of a UAV assembled in a scout configuration for use in the invention.
Figure 2B:
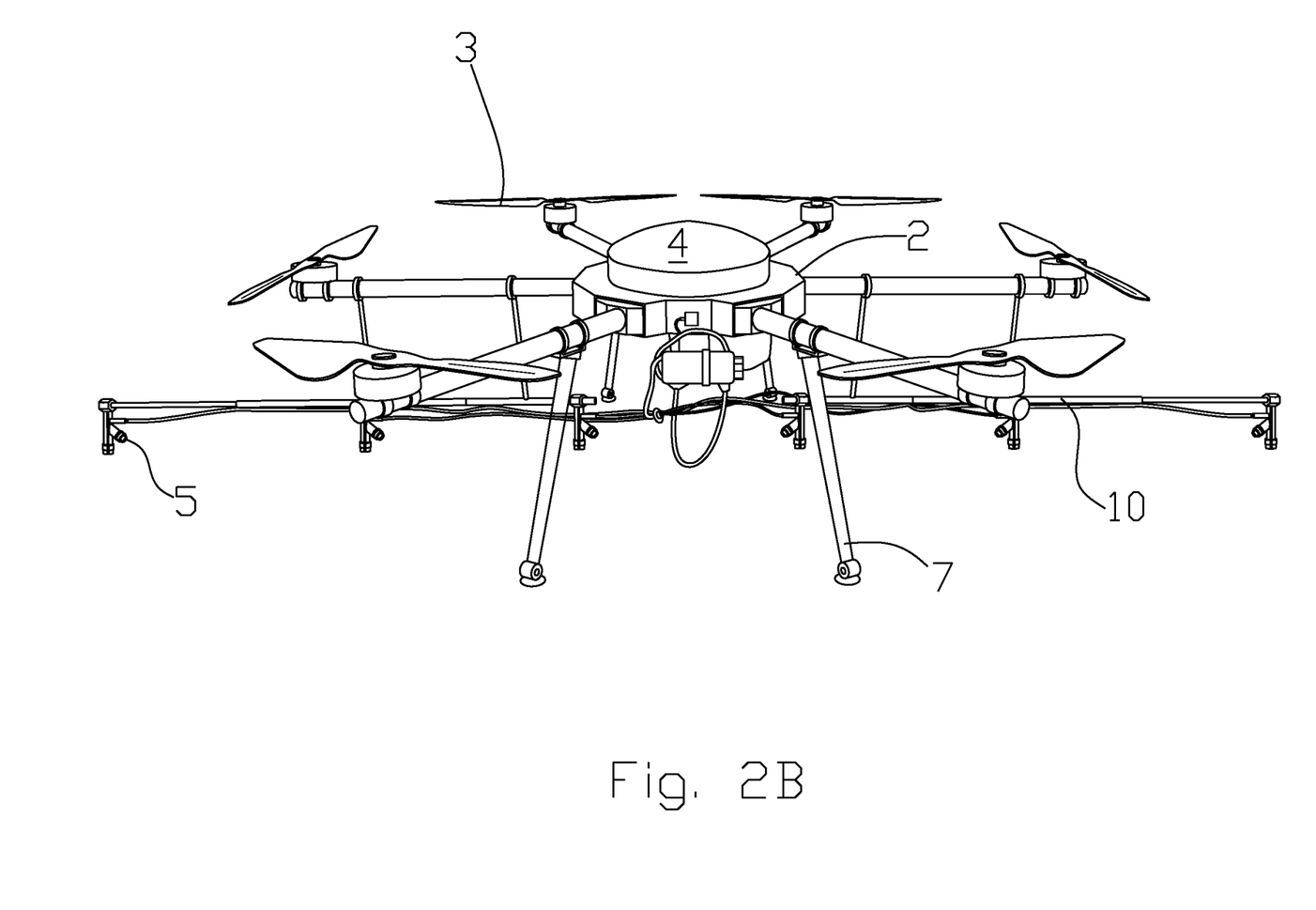
FIG. 2B shows a second configuration of a UAV for use in the invention and having a plurality of individually controllable nozzles.

FIG. 2A shows an elevation view of an embodiment of the UAV 1 configured in a scout mode. It should be noted that the scout UAV may be a smaller size than the treatment UAV. If the scout UAV is smaller than the treatment UAV, it may not have a liquid treatment reservoir or spray nozzle. Otherwise a treatment UAV may be designated as the scout UAV and used accordingly. In a first instance, the UAV 1 comprises a plurality of rotors 3, a body 2, and at least one cap 4 which opens into a treatment tank arranged within the body 2. A spray nozzle 5 and a camera 6 arranged between a pair of legs 7. FIG. 2B shows an elevation view of an embodiment of UAV 1 configured with a boom 10 that includes a plurality of spray nozzles 5. The spray nozzles may be singly operated or operated in concert according to the amount of treatment chemicals to be applied. For instance, a weed encountered on the left side of the UAV may require the application of herbicide through only the outer left nozzle; whereas a plurality of weeds growing between rows of plants may require the use of all nozzles simultaneously.

Figure 3:
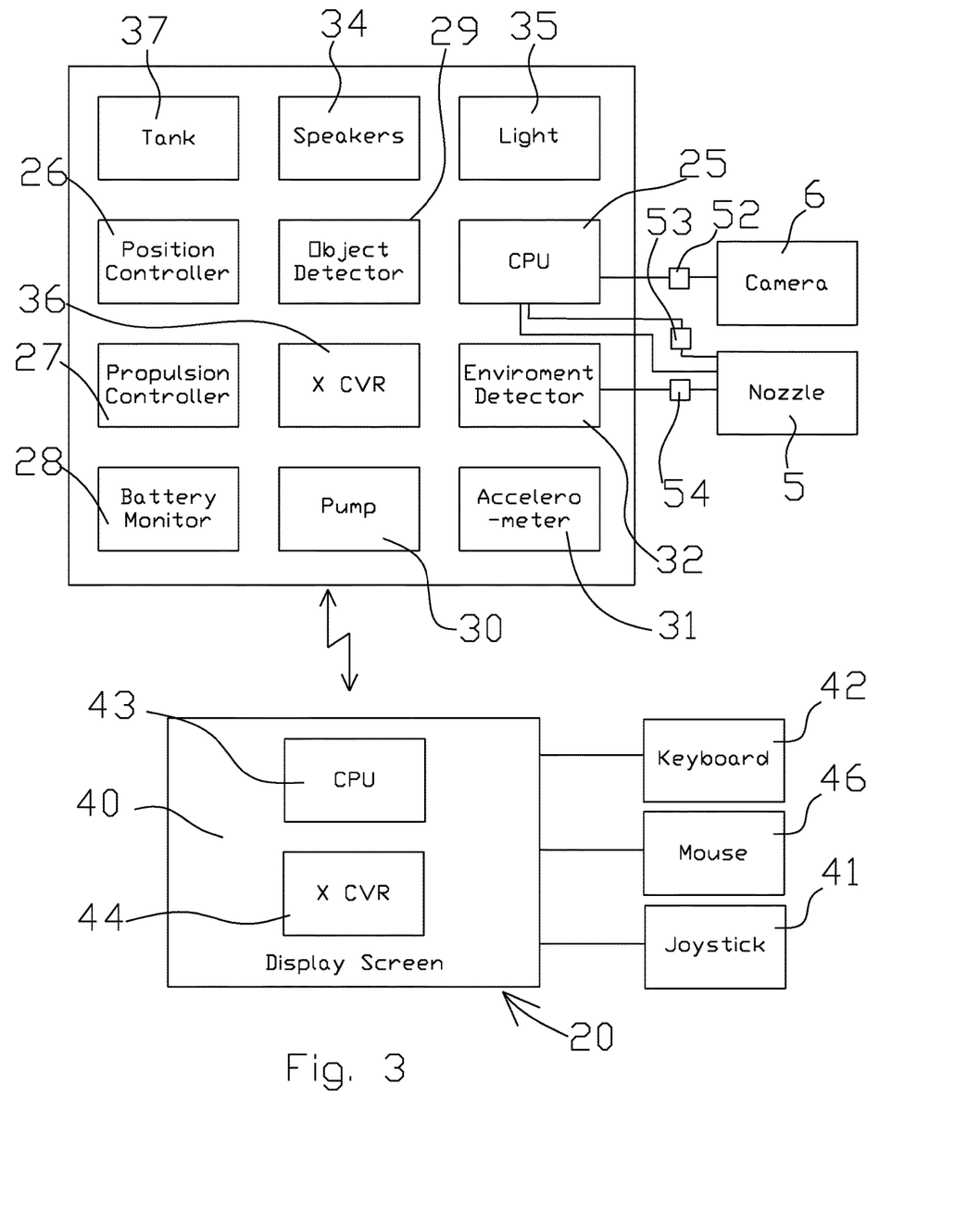
FIG. 3 shows a schematic view of a system including a controller and the UAV shown in FIGS. 2A and 2B.

FIG. 3 shows a schematic view of a system including a controller and the UAV shown in FIGS. 2A and 2B. The UAV 1 includes a position controller 26 which may comprise a GPS unit and/or a downward facing height emitter/receiver unit to detect the location and elevation of the UAV. A propulsion control unit 27 includes the necessary code for ensuring stable flight operations of the UAV and may receive inputs from the accelerometer 31, position controller 26, and environment detector 32 including wind speeds, direction of travel, location and elevation. At least one object detector 29 is arranged on the exterior of the UAV 1 for detecting fixed and mobile objects. Otherwise, the camera 6 may be utilized in identifying objects. The CPU 25 controls all of the onboard operations of the UAV and transceiver 36. Some or all of the databases shown in FIGS. 5-8 may be stored within the memory of the CPU 25. Information detected by the UAV 1 may be transmitted back to base station 20 or to other UAVs. Pump 30 receives liquid from tank 37 and directs it to nozzle 5. Electrical connector 53 connects the CPU 25 to nozzle 5 for opening/closing it and thereby controlling the flow of treatment chemical from pump 30 through nozzle 5. Coupler 54 couples the nozzle 5 to a supply line extending from pump 30 such that the nozzle 5 can be interchanged for a plurality of nozzles as shown in FIG. 2B. The environment detector 32 may comprise wind speed detectors, temperature and humidity sensors and the like which impact the operation of UAV 1. Accelerometer 31 is used to determine the speed and direction of movement of the UAV 1. The base station 20 comprises a display 40, CPU 43, transceiver 44 as well as input devices such as joystick 41, mouse 46, and keyboard 42. The display provides a user interface for relaying information to the user including pictures from the drones, detected conditions and the like. The keyboard 42 allows the user to input data including prices and operation codes to the UAV. Joystick 41 allows a user to fly the UAV(s). Mouse 46 allows the user to scroll between control screens displayed on display screen 40 and to selectively input and remove information in the CPU 43. Light 35 and speaker 34 may be used to indicate the position of the UAV as well as to drive animals from the treatment area. Tank 37 is filled with liquid treatment chemicals an output line connects to the pump 30 which is in-line with the nozzle 5. Battery 28 includes a monitor which alerts the CPU 25 when power is low and the UAV needs to return to the docking station or base unit for recharging.

Figure 4:
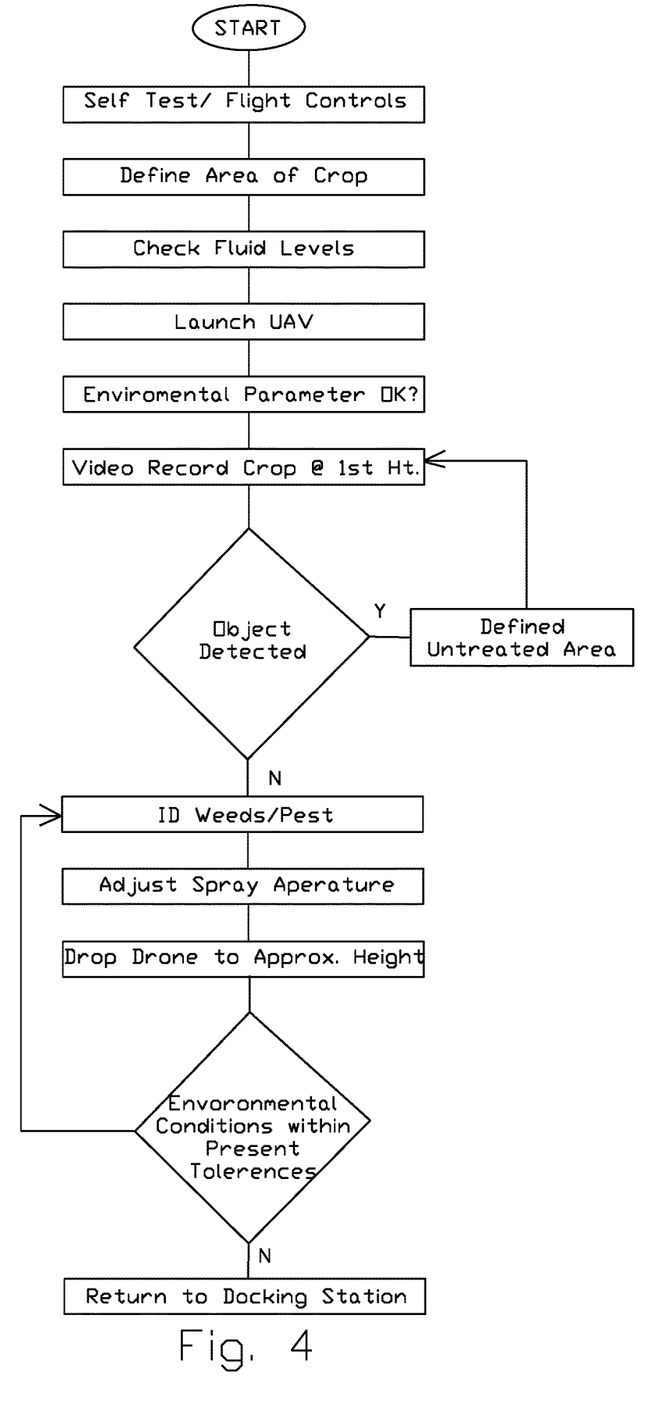
FIG. 4 shows a flowchart showing how the UAV traverses a field.

FIG. 4 shows a flowchart for treating a field. Initially, the UAV conducts a self-test on the flight controls, circuits and other hardware. An area to be treated is defined within the memory of the treatment UAV. The treatment area may be defined either manually or by receiving mapping data from a scout UAV as mentioned above. The UAV checks fluid levels within in the treatment tank and environmental parameters such as wind speed to ensure safe operation of the UAV. The UAV is launched and a series of pictures or a video of the crop to be treated is scanned to determine whether weeds and/or insects are present at a first height. The weed, insect, and crop databases are consulted to identify the respective objects of interest. If a single UAV is being used to treat the crop, upon identifying one of these objects of interest, the spray nozzle aperture of the UAV is adjusted and the UAV drops to an appropriate elevation and while considering the cross wind, the spray nozzle is articulated and the area is treated. Otherwise if a plurality of UAVs is used, the location of weeds/pests are logged from the UAV and communicated from the scout UAV to the base station or directly to other UAVs for treatment. Object detection means send out signals which bounce off of objects, such as animals or obstacles, are returned to the UAV to indicate the position of objects and logged into a memory and/or conveyed to the base station and the other UAVs. The UAV then moves along to treat other areas away from the detected objects. If no objects are detected, the treatment continues and the weeds/pests are identified. The spray nozzle is adjusted and a treatment is applied after the drone drops to an appropriate height. The environmental conditions are continuously monitored during the treatment process and the drone(s) return to a docking station if the environmental conditions are outside a preset threshold.

Figure 5:
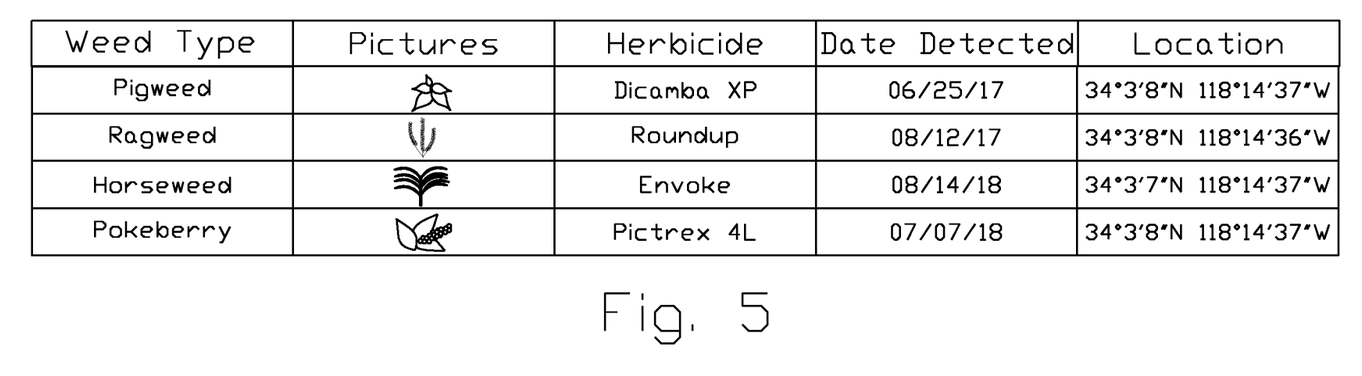
FIG. 5 is a view of the weed database necessary to practice the invention.

FIG. 5 shows a schematic view of the weed database. The weed database includes the name of each weed. The effective types of herbicides which will kill the weed is listed. It should be noted that a single herbicide may treat several of the weeds. Photographs of weeds are provided in the database for recognition purposes. The number and types of weeds detected in a sampled area is included in this database as well as their respective locations.

Figure 6:
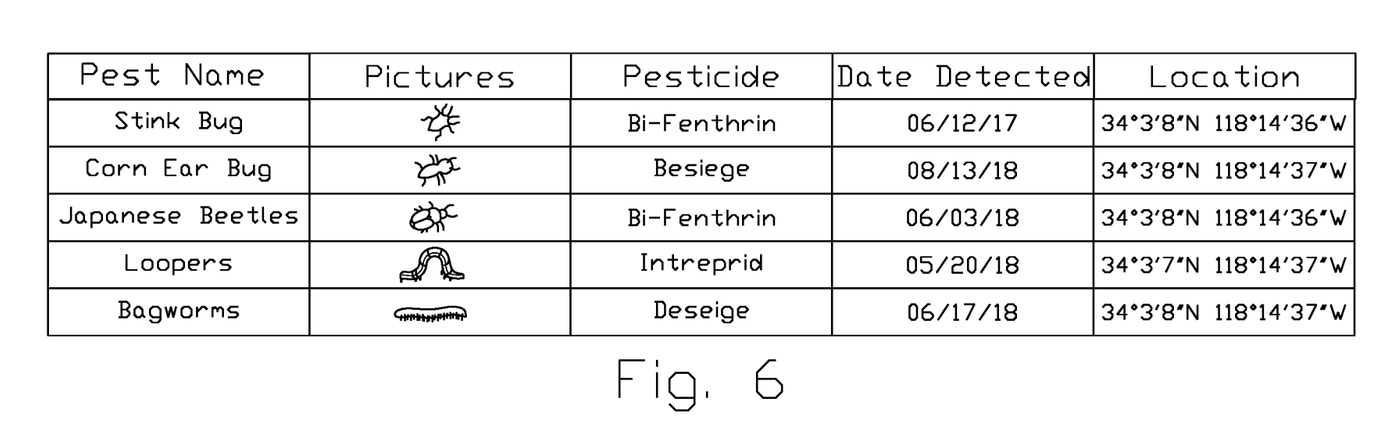
FIG. 6 is a view of the pest database.

FIG. 6 is a view of the pest database. The name of each pest and its associated photo is included in this database. Photos of the pests in each phase of development are included. Photos may include ones of damage to plants for further recognition of pest problems. The pesticide(s) for treating the pests are listed in an associated column. A single pesticide may treat many of the different pests. A date that the pest(s) were detected and an amount of pesticide used may be included in the pest database. The numbers and types of each pest detected in the treatment area is logged into this database.

Figure 7:
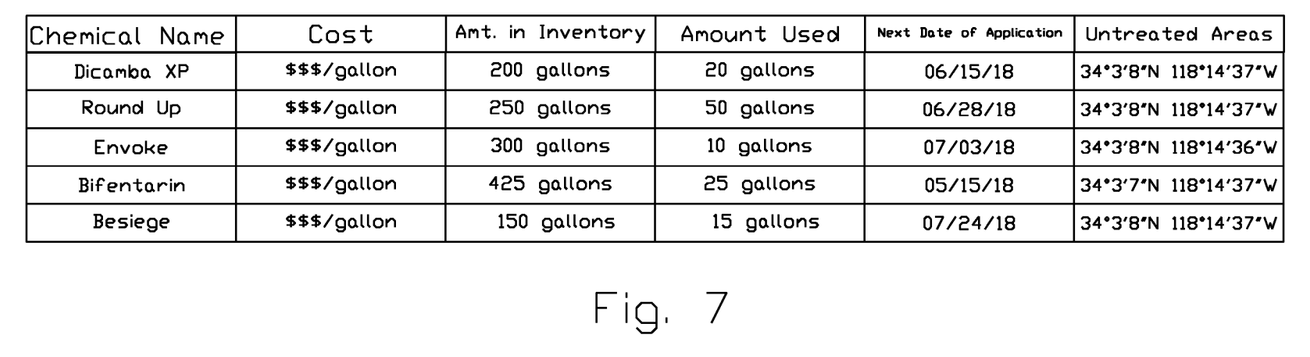
FIG. 7 is a view of the treatment database.

FIG. 7 is a view of the treatment database. The treatment database lists the names of both herbicides and pesticides. The types of pests and weeds detected as well as their location are listed. It also lists the plants which may be killed by each herbicide, as well as the pests that are eliminated by each pesticide. The price per gallon for each treatment liquid may be listed in this database for determining the most cost-effective method for ridding an area of both pests and weeds. The amount of each treatment chemical in inventory is included. Identifying information such as GPS coordinates are maintained in this database for each area to be treated as well as each sampled area of the treatment area. A treatment date and amount of herbicide applied may also be included in the database for future analysis including projected future amount needed. Likewise, the coordinates of untreated areas are maintained in this database.

Figure 8:
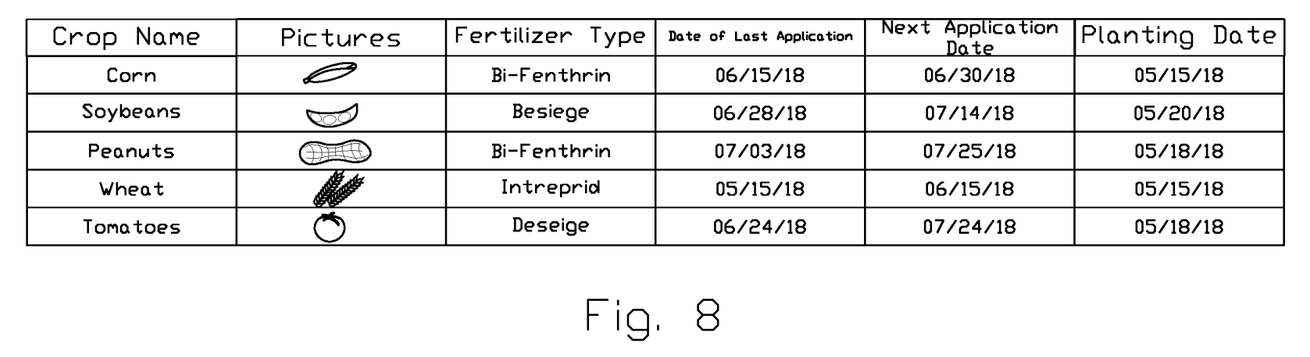
FIG. 8 is a view of the crop database.

FIG. 8 is a view of the crop database. The names of the various crops that may be grown are maintained in this database. Photographs of healthy crops at various growth stages are maintained in this database. Types of liquid fertilizers are maintained in this database as well as the date of last application and when the next application should be applied. A planting date is provided for determining when crop failure has occurred. Germination rate may also be maintained in the crop database for purposes of analyzing the overall crop growth. A germination period may be included to determine when a planted crop should be breaking the soil. Photographs of various crops with deficiencies may be also maintained in this database.

Figure 9A:
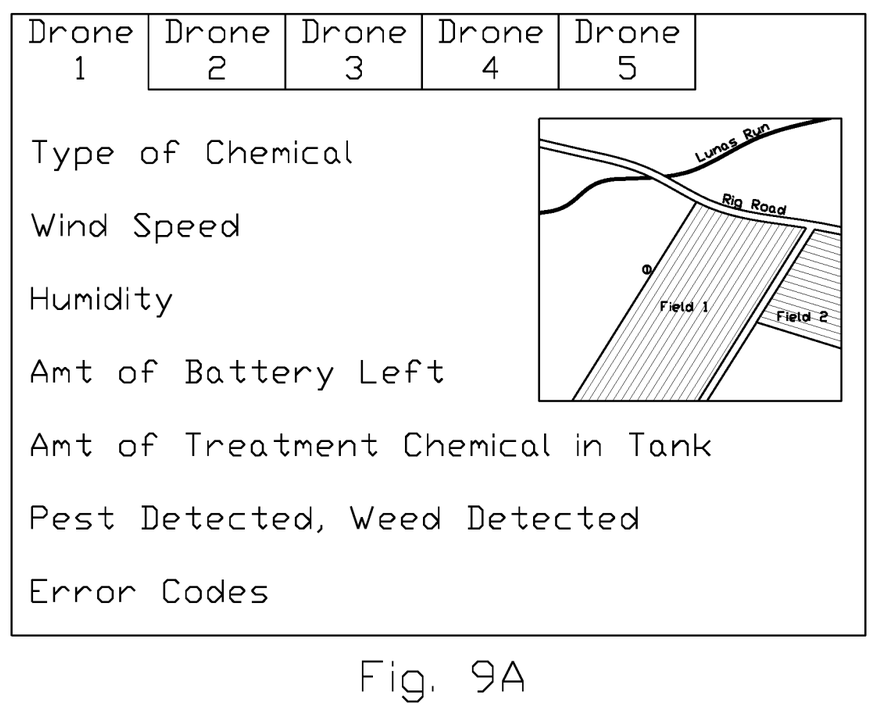
FIG. 9A is a screenshot of a controller which controls the process.

FIG. 9 is a screenshot 70 of a controller which controls the process. The screenshot 70 includes a plurality of tabs 75 for each UAV is listed. Included information displayed includes the type of chemical currently loaded into the tank of a respective UAV is shown. An amount of chemical is also shown. The wind speed detected by this UAV is displayed. A battery monitor shows the amount of power left in the battery of the UAV. The types of pests and/or weeds detected are also shown as well as error codes. A map of the treatment area and the location of the UAV on the map is shown along with a display of untreated areas.

Figure 9B:
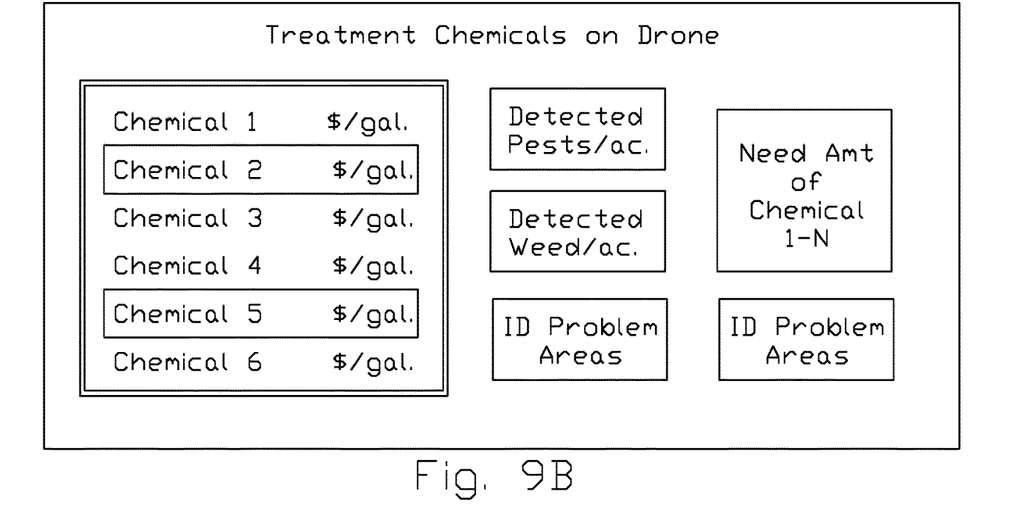
FIG. 9B is a selection screen which consolidates information for the user to select an appropriate chemical treatment.

FIG. 9B includes an output screen that includes a plurality of chemicals and their price per gallon. The appropriate chemical for treating the pests and weeds and may be highlighted by flashing it. A list of detected pests and weeds are shown. Any identified problem areas such as over or under watering, under fertilized, or the like is indicated here. An amount of each treatment chemical that should be used is also shown. Current detected environmental conditions shown to alert the user whether the treatment should be undertaken at this time.

Figure 9C:
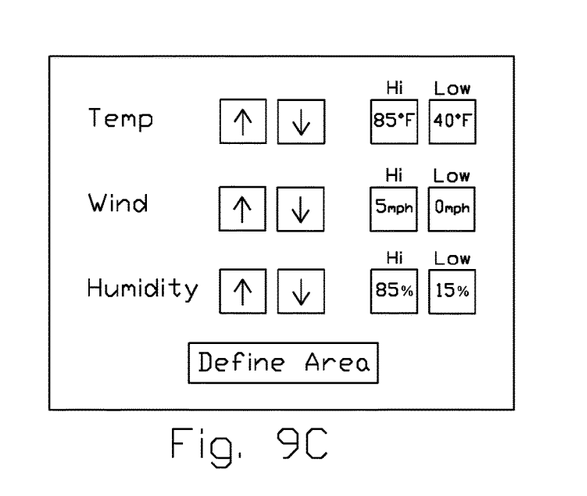
FIG. 9C is an input screen for inputting environmental conditions and selecting an area to be treated.

FIG. 9C includes an input screen for entering preset operating conditions for the UAV treatment process. A high temperature and a low temperature limits are inputting using a mouse, keyboard, or touch screen. Wind speed limit also is input. Humidity limits are entered using the same method. An area of treatment is entered by actuating a define area input and thereafter the area to be treated is entered.

It is to be understood that the invention is not limited to the exact construction illustrated and described above, but that various changes and modifications may be made without departing from the spirit and the scope of the invention as defined in the following claims. While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

We claim:

1. A process of treating a crop, said process comprising:
defining an area to be treated and determining an overall size of said area to be treated;
creating a sample area of the area to be treated by photographing at least one small area and analyzing the at least one small area by comparing it with at least one of a weed database and a pest database to determine a total number and type of at least one of either weeds and pests;
extrapolating a total number of at least one of weeds and pests present in the area to be treated;
selecting a treatment liquid to treat the area to be treated from a treatment database according to cost, said treatment liquid including one or more selected from a pesticide and a herbicide;
filling a reservoir in at least one unmanned aerial vehicle with the treatment liquid selected from the treatment database; and,
flying the at least one unmanned aerial vehicle across the defined area and spraying the treatment liquid onto at least one of the weeds and pests when environmental conditions are within preset limits.

2. The process of treating a crop of claim 1 further comprising creating a weed database that comprises at least an array having a list of weeds and a list of corresponding herbicides which will kill each of the weeds listed in the weed database, said weed database comprising a plurality of pictures of each weed listed in the weed database which show each weed at various growth stages.

3. The process of treating a crop of claim 1 further comprising creating a pest database that comprises at least an array having a list of pests and a list of corresponding pesticides which will kill each of the pest listed in the pest database, said pest database comprising a list of pictures of each pest at various stages of the pest lifecycle.

4. The process of treating a crop of claim 1 further comprising creating a treatment database that comprises at least an array having a list of treatments for weeds and pests and providing a price per acre for treatment for each treatment.

5. The process of treating a crop of claim 1 further comprising creating a crop database having a plurality of pictures of representing a health of plants that comprise the crop.

6. The process of treating a crop of claim 1 further comprising comparing the various treatments and determining the cheapest treatment for treating the discovered pests and weeds.

7. The process of treating a crop of claim 1 further comprising comparing pictures of heathy plants stored in the crop database with each of plant of the crop to determine an overall health of the crop and whether a healthy level of fertilizer and water.

8. An Unmanned Aerial Vehicle system comprising:
at least one central processing unit which allows a treatment area to be defined and an overall size of an area to be treated to be calculated;
a camera which photographs samples of the area to be treated; and,
an identification program which determines the number of pests and weeds within the photographed samples of the area to be treated and determining an estimated number of weeds and pests present in the area to be treated, said identification program generating an output indicating which chemicals will effectively treat detected pests and weeds.

9. An Unmanned Aerial Vehicle (UAV) comprising:
a body;
a plurality of rotors mounted to said body,
at least one cap which opens into a treatment tank;
a spray nozzle and a camera arranged between a pair of legs which support the UAV when it is during nonflight; and,
a control program comprising a plurality of databases which include weeds, pests and treatment chemicals, said control program including an input for inputting preset environmental conditions including temperature, wind speed, and humidity, said preset environmental conditions being consulted by the control program to determine whether a chemical treatment should be undertaken, said control program further including a selection input which allow a user to select at least one chemical to be loaded into the treatment tank based upon detected pests and weeds, price and amount of the at least one chemical being in inventory.

10. A process for operating a control system for a drone, said process comprising:
creating a plurality of databases which include weeds, pests, and treatment chemicals;
determining an estimated number of weeds and pests within an area;
inputting preset environmental conditions including temperature, wind speed, and humidity;
consulting the preset environmental conditions to determine whether a chemical treatment should be undertaken;
electing at least one chemical to be loaded into a treatment tank based upon detected pests and weeds, price, and amount of the at least one chemical being in inventory.

* * * * *